June 3, 1930.  P. B. REEVES  1,761,155
BELT SPLICE
Filed Jan. 10, 1929
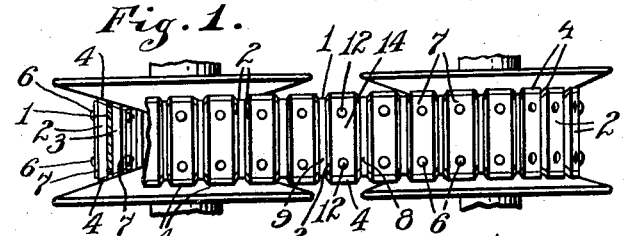
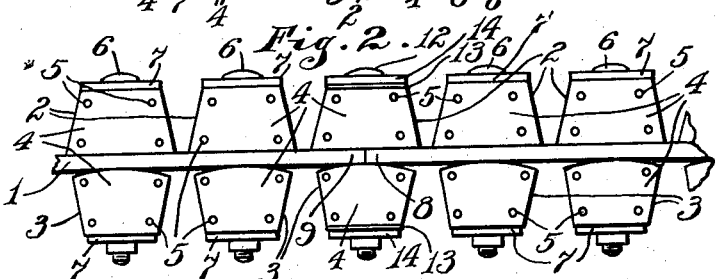
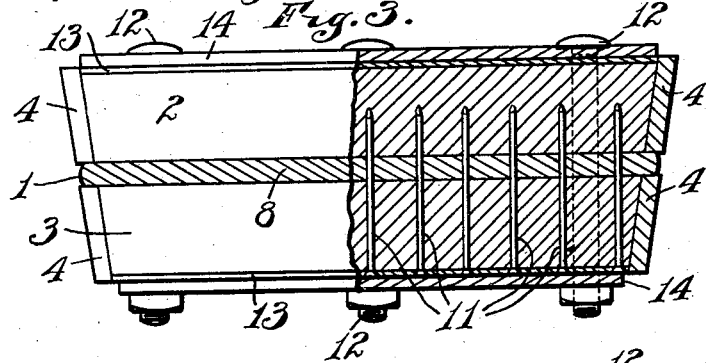
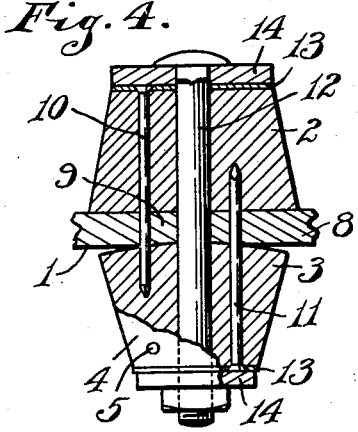
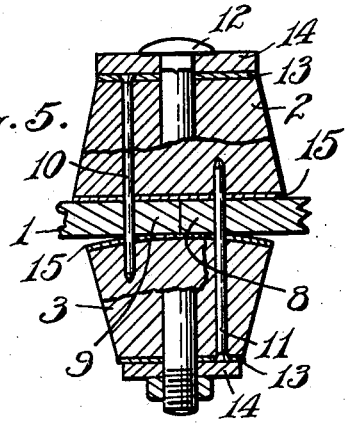
INVENTOR.
Paul B. Reeves,
BY
Hood & Hahn
ATTORNEYS Patented June 3, 1930

1,761,155

UNITED STATES PATENT OFFICE

PAUL B. REEVES, OF COLUMBUS, INDIANA, ASSIGNOR TO REEVES PULLEY COMPANY, OF COLUMBUS, INDIANA, A CORPORATION OF INDIANA

BELT SPLICE

Application filed January 10, 1929. Serial No. 331,656.

My invention relates to improvements in belt fasteners and particularly to that type of belt employed in variable speed mechanisms, particularly of the class embodying two pairs of cone pulleys, the pulleys of each pair of which are adapted to move relatively to one another for varying the distance there-between.

It is one of the objects of my invention to provide a belt splice or means for securing the ends of the belt together which will permit of the ready connection of the ends of the belt but which at the same time will not affect the balance of the belt so that when the belt is applied it will run without noise and without decreasing in any way the efficiency of the belt.

For the purpose of disclosing my invention I have illustrated an embodiment thereof in which Fig. 1 is a plan view of a belt embodying my invention applied to a speed changing device, only so much of the device being shown however, as is necessary to illustrate the application of the invention;

Fig. 2 is an edge elevation of a belt embodying my invention;

Fig. 3 is a transverse sectional view of the belt, certain of the belt blocks being shown in section;

Fig. 4 is a longitudinal sectional view of the structure illustrated in Figs. 2 and 3, and Fig. 5 is a longitudinal sectional view of a modification thereof.

In the embodiment of the invention illustrated, the belt 1 may be of any suitable material such as leather, rubberized fabric or the like. And on this belt is secured at suitable intervals friction blocks 2 on the top of the belt and 3 on the bottom of the belt. These blocks have tapered ends provided with suitable friction material 4 which may be in the form of leather or other suitable material. The friction faces 4 are preferably secured to the ends or faces of the blocks by means of glue and suitable securing brads 5. The blocks are clamped in position on the belt by means of bolts 6 which extend through both the upper and the bottom blocks, metal plates 7 being arranged on the top and bottom sides of the blocks.

In securing the ends of the belt together the two ends 8 and 9 are brought together until they abut. A series of brads or nails 10 are driven through the top block and are adapted to pass through the end 9 of the belt and into the bottom block. A similar series of nails or brads 11 are driven through the bottom block through the end 8 of the belt and into the top block and for securely clamping the blocks together bolts 12 pass through both blocks.

By this arrangement the separation of the belt ends requires only the removal of one of the blocks which releases that end of the belt from the other. In order that the nails may take into the same openings in the blocks after they have been removed, and it is desired to place the same again in position, I preferably provide templet plates 13 which are arranged on the outer face of each block and are provided with openings through which the nails pass.

These templet plates position the nails and where, in some instances the opposite blocks are bored to receive the ends of the nails, fitting of the nails into the openings in the correct manner is insured.

On the outer face of each of the blocks there is also provided a metal clamping plate 14.

In some instances, in order to prevent the wood of the blocks from splitting, under the lineal strain on the belt, I provide on the clamping face of each of the blocks a metal plate 15 through which the nails or prongs project.

I claim as my invention:

1. In a belt fastener the combination with a belt, of a pair of belt blocks associated therewith, one on the upper face and the other on the lower face of said fastener, each of said blocks being provided with projecting prongs on one side of a line extending transversely through the center of the blocks, said prongs being adapted to pass through a belt end and into the opposite block.

2. In a belt fastener the combination with a belt, of a pair of belt blocks, one arranged to be disposed on each face of the belt, each of said blocks being adapted to overlap the adjacent ends of the belt and provided with prongs at one side of the meeting edges of the belt adapted to pass through the belt and into the opposite block.

3. In a belt fastener the combination with a belt, of a pair of belt blocks one adapted to be arranged on each face of the belt and both adapted to overlap the meeting edges of the belt, each of said blocks having at one side of the line passing through the center thereof projecting prongs adapted to pass through the belt and into the opposite block and means for clamping the blocks together.

4. In a belt fastener the combination with a belt, of a pair of blocks, one adapted to be arranged on each face of the belt, said blocks being adapted to overlap the meeting edges of the belt, securing prongs extending through each of the blocks through one end of the belt and into the opposite block, and means for clamping said blocks together.

5. In a belt fastener the combination with a belt, of a pair of blocks, one adapted to be secured on each face of the belt, each of said blocks having securing prongs adapted to extend through one end of the belt and into the opposite block and means for clamping said blocks together, said blocks being adapted to overlap the meeting edges of the belt.

In witness whereof, I have hereunto set my hand at Columbus, Indiana, this 7th day of January, A. D. one thousand nine hundred and twenty-nine.

PAUL B. REEVES.